United States Patent [19]

Dekura

[11] Patent Number: 5,225,549
[45] Date of Patent: * Jul. 6, 1993

[54] PERFLUOROPOLYETHER LUBRICANTS FOR ELECTROMAGNETIC RECORDING MEDIA

[76] Inventor: Takateru Dekura, No. 1-3, Sasame-cho, Kamakura-shi, Kanagawa-ken, Japan

[*] Notice: The portion of the term of this patent subsequent to Jul. 23, 2008 has been disclaimed.

[21] Appl. No.: 821,893

[22] Filed: Jan. 15, 1992

Related U.S. Application Data

[63] Continuation of Ser. No. 283,870, Dec. 13, 1988, abandoned.

[30] Foreign Application Priority Data

Oct. 8, 1988 [JP] Japan .................. 63-254327

[51] Int. Cl.$^5$ .................. C10M 105/70; C07D 251/18; C07D 251/48; C07D 251/00
[52] U.S. Cl. .................. 544/208; 252/51.5 A; 252/54; 252/58; 544/194; 544/196; 544/199; 544/204; 544/211; 544/216
[58] Field of Search .................. 252/51.5 A, 58; 544/196, 199, 204, 208, 216, 211, 194

[56] References Cited

U.S. PATENT DOCUMENTS

| | | | |
|---|---|---|---|
| 3,654,273 | 4/1972 | Schuman et al. | 544/216 |
| 3,715,378 | 2/1973 | Sianesi et al. | 252/54 |
| 3,758,555 | 9/1973 | Koshar et al. | 544/216 |
| 3,816,416 | 6/1974 | Croft et al. | 544/216 |
| 4,647,413 | 3/1987 | Savu | 544/216 |
| 5,034,525 | 7/1991 | Dekura | 252/51.5 A |

FOREIGN PATENT DOCUMENTS

867279 5/1961 United Kingdom ............. 260/249.6

Primary Examiner—Jerry Johnson
Attorney, Agent, or Firm—Keck, Mahin & Cate

[57] ABSTRACT

Lubricants for electromagnetic recording media are characterized in that they are amides, imides or amide-imides consisting of perfluoroalkylpolyether derivatives. The derivatives are reacted with perfluoropolyether radicals and cyclic amino compounds, nitrogen-containing heterocyclic amino compounds and phosphonitrile amide compounds. The general formula is represented by (1)

$$(Rf)_1-Z \qquad \ldots (1)$$

with the molecular weight of the Rf group being comprised between 400 and 10,000.

4 Claims, No Drawings

PERFLUOROPOLYETHER LUBRICANTS FOR ELECTROMAGNETIC RECORDING MEDIA

This application is a continuation of application Ser. No. 07/283,870 filed Dec. 13, 1988, now abandoned.

BACKGROUND OF THE INVENTION (1) Field of the Invention

The present invention relates to lubricants for electromagnetic recording media which lubricants represent amides, imides or amide-imides in which amino radicals, imino or amino-imino radicals have been substituted onto fluorine-containing polyether derivatives.

These lubricants present a superior effect as they are capable of forming thin-film layers firmly adhering to materials such as metal surfaces, glass, ceramics, and carbon and of providing favorable lubricating properties.

(2) Description of the Prior Art

When the electromagnetic recording medium and the electromagnetic head are stationary, the condition prevailing therebetween is characterized by a sliding movement, whereas, in the operating status, the flying head floats above the medium held thereupon in a fluidized lubrication state so that lubrication is required between the floating surface of the electromagnetic head and the electromagnetic recording medium, for which purpose a lubricant is applied to the surface thereof.

It has been the conventional practice to employ, as the lubricant for this purpose, perfluoroalkylpolyether compounds such as, for example, the compounds set forth in the specifications of U.S. Pat. No. 3715378, the specifications of U.S. Pat. No. 377808, and the specifications of European Patent No. 791032170.

Said perfluoroalkylpolyether compounds are superior lubricants combining the favorable properties of a high heat resistance with outstanding chemical inertness and a low vapor pressure. Being perfluorinated compounds, all of whose hydrogen atoms have been replaced by fluorine atoms, they also possess a low surface tension and a favorable wettability but present a poor absorption on organic and inorganic materials.

In recent years, thin-film electromagnetic recording media with a high recording density have been developed, and in order to improve the electromagnetic transducing characteristics between the electromagnetic recording medium and the flying head it is desirable that the lubricant film applied to the surface of the recording medium should be as thin as possible, with the requirement being that the thickness of the lubricant film should be 20Å–50Å (0.002–0.005 μm).

If the lubricant film has a thickness in excess of 100Å (several 0.01 μm), the head may adhere to the surface of the recording medium. The small rotational torque caused by this sticking phenomenon will make it impossible for the medium to commence rotation. It is therefore essential that the thickness of the lubricant film applied to the surface of the recording medium should be in the range from one to several molecular layers.

In order to resist the shock or wear of a flying head by applying a lubricant layer of one to several molecular layers onto the surface of the recording medium, it is essential that the lubricant should not only have a low coefficient of friction and a low surface tension but also exhibit a good adhesion to the recording medium.

In order to improve the adhesion properties of the lubricant on to the recording medium, attempts have been made to achieve such adsorption, onto the electromagnetic recording medium, of a perfluoroalkylpolyether type lubricant by substitution of a polar group onto the end of the perfluoropolyoxyalkylene radical and by increasing the dipolarization effect of this polar radial to a level exceeding a certain value.

These attempts are documented in the specifications given in U.S. Pat. No. 4,267,238, the specifications of U.S. Pat. No. 4,268,556, and the specifications of Japanese Patent Provisional Publication No. 126627/1986.

Perfluoroalkylpolyether type lubricants having a polar radical at the end, achieve said adsorptive adhesion onto the surface of the recording medium by virtue of said polar group and retain their lubricity as a result of the perfluoropolyoxyalkylene chains extending therefrom.

Fluorine-containing lubricants have been developed as chemical substances offering a greater degree of safety and a superior suitability for use in extremely severe conditions and are extensively used in such fields as require a high chemical and heat resistance.

For this reason, the main application fields in which said fluorine-containing lubricants are being used are limited to such industrial sectors as the semiconductor industry handling low vapor pressure, nonflammable, corrosive gases, the mechanical equipment areas including bearings, mechanical conveyors, chains, and machinery in the vicinity of furnaces associated with high temperature operation.

However, the realization that fluorine-type lubricants have superior properties has led to a significant expansion of their applications to include such areas as factory automation equipment, industrial robots, computer and computer-related equipment, and electrical household appliances.

The lubricants used for these types of equipment and machinery are required to meet a multiplicity of exigencies which, to a large extent, have not been capable of being fulfilled with the fluorine-containing lubricants available until now.

Whereas perfluoroalkylpolyether lubricants have an inadequate load resistance in the low-molecular range, these perfluorinated alkylpolyether lubricants exhibit a low surface tension and a favorable wetting behavior in the high-molecular range but, due to their lacking adsorption on metal surfaces, they tend to give rise to lubricant migration with resulting lubrication deficiencies during high-speed rotation.

Thus, though these lubricants are imparted a very high degree of stability, their adsorption onto metal surfaces tends to be poor and while the lubricating effect in the lubrication of sliding movement is satisfactory in the initial period, long-term operation of the machine will result in a depletion of the lubricant amount to an inadequate level, so that the lubricating effect tends to diminish.

For this reason, it is essential to enhance lubricant adsorption and improve the wear resistance of lubricants even if this implies a certain trade-off by sacrificing their stability to a certain extent, as may be required by the particular application.

SUMMARY OF THE INVENTION

The aim of the present invention is therefore to provide lubricants for electromagnetic recording media with an enhanced adsorption onto the surfaces of metals, carbon, ceramics, and glass and other materials to which they are applied in a thin film.

DESCRIPTION OF THE PREFERRED EMBODIMENTS

The present invention will be explained in detail hereinunder.

General formula (1)

$$(Rf)_l—Z \quad \ldots (1)$$

The compounds according to this invention and comprised of lubricants for electromagnetic recording media have the general structure shown in the formula (1) given hereinabove, and, representing fluorine-containing alkylpolyether derivatives, they consist of compounds obtained by amidation of the amino radical, imidation of the hydrogen atoms attached to the nitrogen atom of a heterocycle ring, with the introduction of the Rf group.

The Rf group given in the general formula (1) hereinabove is characterized in that its molecular weight is comprised between 400 and 10,000, and it is preferable that the molecular weight should be comprised between 1,000 and 4,500.

The group Rf of the compound denoted by the general formula (1) is responsible for the lubricating properties of the lubricant, and, if its molecular weight decreases to 1,000 or less, the viscosity of the lubricant will drop, resulting in a deterioration in wear resistance.

Conversely, as the molecular weight of Rf increases, the wear resistance of the lubricant will improve and its viscosity will increase so that, when the lubricant is applied onto the electromagnetic recording medium in the form of a thin film, the lubricant will facilitate a better adhesion with the flying head as the film thickness increases.

Moreover, the Rf groups in a given molecule may be identical or different, and nor is it an essential requirement that all of the hydrogen atoms should be substituted by fluorine. Rather, for the lubricant to retain its favorable lubricating properties, it may suffice for the fluorination to be only partial, with a residual few percent of hydrogen remaining unsubstituted The groups listed below in (2) may be considered appropriate.

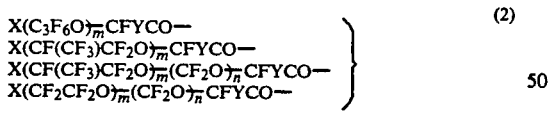

where m is an integer having a value between 3 and 85, and n an integer ranging from 1 to 100, and where X represents one selected from the group consisting of H—, F—, CF$_3$—, C$_2$F$_5$—, C$_3$F$_7$—, CF$_3$O—, C$_2$F$_5$O—, and C$_3$F$_7$O—, and Y represents one selected from the group consisting of F—, CF —, and C$_2$F$_5$—, respectively.

The value of l may be comprised between 1 and 8.

Z may denote an aromatic, heterocyclic or phosphonitrile ring containing the amino, imino or amino-imino groups. The amino groups may be bonded in the position of the carbon atom of the ring skeleton or in the bond structure of the nitrogen atom, with at least one coordinate bond formed by a polar group or an electron-donating bond, with the characteristic feature of the resulting compound being that it provides a strong adsorptive adhesion to metals, carbon, silicon dioxide, and ceramics by virtue of the above bond strength.

Some examples of the compounds in accordance with the present invention are given hereinunder.

(1) Pyridine, pyrimidine, piperazine, triazine rings

Pyridine ring

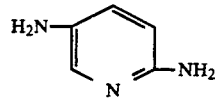 (2,5 diamino pyridine)

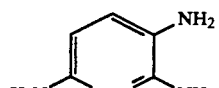 (2,3,6 triamino pyridine)

Pyrimidine ring

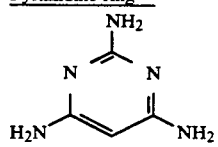 (2,4,6 triamino pyrimidine)

Piperazine ring

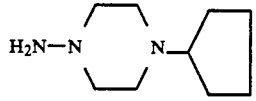 (1-amino 4-cyclo pentylpiperazine)

Triazine ring

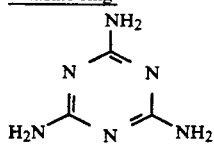 (2,4,6 triamino-1,3,5-triazine

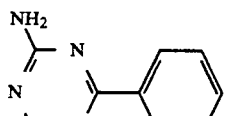 (2,4-diamino 6-phenyl 1,3,5-triazine)

(2) Triazole, tetrazole, thiazole, thiadiazole rings

Triazole ring

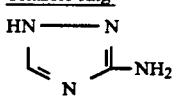 (3-amino 1,2,4-triazole)

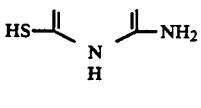 (3-amino 5-mercapto-1,2,4-triazole)

Tetrazole ring

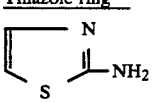 (5-amino 1H-1,2,3,4 tetrazole)

Thiazole ring (2-amino thiazole)

-continued

Thiadiazole ring

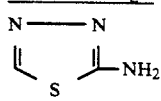
(2-amino 1,3,4-thiadiazole)

(3) Cyclic phosphonitrile Amide

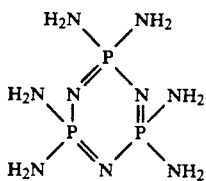
(Phosphonitrile acid amide trimer)

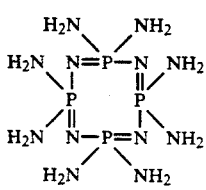
(Phosphonitrile acid amide tetramer)

(4) Diphenyl/Diphenoxy Derivatives

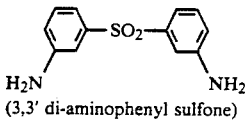
(3,3' di-aminophenyl sulfone)

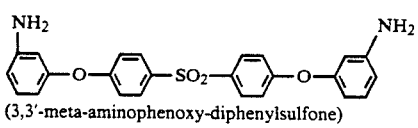
(3,3'-meta-aminophenoxy-diphenylsulfone)

The lubricant for electromagnetic recording media in accordance with the present invention and shown in the general formula (1) hereinabove is an extremely effective lubricating agent if it is applied to electromagnetic recording media with a high recording density in such a manner as to form a film thickness corresponding to one or several molecular layers.

The methods available for ensuring the formation of a lubricant film should provide for the absence of dust particles and produce a film that is easy to wipe off. These methods may include, by way of example, an application procedure in which the lubricant in accordance with the present invention is dissolved in trichlorotrifluoroethane or a similar solvent so that the concentration of the lubricant compounds denoted by the general formula (1) hereinabove becomes 0.02–0.08% by weight, and the solution applied to the surface to be lubricated by spraying or immersion and withdrawal from the solution, with subsequent aging for a predetermined time at a temperature of 100° C.–150° C.

The electromagnetic recording medium, onto whose surface the lubricant in accordance with the present invention is applied, consists of, at least, an electromagnetic recording layer and a protective film coating said recording layer, formed on a substrate taking the shape of a solid disk.

The substrate may be any of the following materials: aluminum, aluminum alloy, ceramics, or glass. Said substrate may, if necessary, be coated with a solid protection film consisting of chrome, nickel-phosphorus, nickel-copper-phosphorus or alumite.

The electromagnetic recording layer may consist of materials such as cobalt, cobalt-nickel, cobalt-nickel-chromium, cobalt-nickel-platinum, cobalt-nickel-phosphorus, or cobalt-platinum.

The protective coating may consist of materials such as silicon dioxide, zirconia, or carbon, and if carbon is used, it is preferable that it should be used in the form of graphite or amorphous carbon.

The reading head, however, may consist of manganese-zinc ferrite as the material for the head core tip and of calcium titanium oxide ($CaTiO_3$) or aluminum oxide titanium ceramics ($Al_2O_3$ TiC) or similar materials for the slider.

The lubricant for the electromagnetic recording medium denoted by the general formula (1) hereinabove has been demonstrated, in fatigue tests, to have a resistance to withstand 30,000 contact—start—stop cycles when a thin film head is used with aluminum oxide titanium ceramics for the slider and a disk coated with a 30Å (0.003μm) thick lubricant film.

The perfluoroalkylpolyether derivatives and the amide and imide compounds consisting of cyclic amino and imino compounds in accordance with the present invention are capable of a firm adsorptive adhesion onto metal and inorganic materials, and of achieving a large bonding area.

In this manner, the terminal or central part adheres to the surface of the material, e.g., metal, while one end or both ends of the Rf group take the shape of a hand stretching out from that surface, with the lubricity increasing as the number of Rf groups increases.

The lubricants for electromagnetic recording media in accordance with the present invention are therefore characterized by their superior properties in terms of their wettability due to their low surface tension, adsorption, and lubricity with respect to carbon and other inorganic materials in applications involving the lubrication of sliding parts rotating at high speed.

The embodiments of the present invention explained hereinbelow are given as practical examples of the invention without, however, limiting the scope of the invention thereby. Thus, for example, the products in which the compounds (1)–(4) represented by the general formula given hereinabove constitute the substituent radical can be manufactured in the following manner.

The lubrication properties, with respect to electromagnetic recording media, of the synthetic compounds (1) through (8) given in the examples can be measured by the following procedures.

The aluminum substrate with nickel-phosphorus applied by galvanizing is subjected to a texturizing treatment to obtain a substrate of a porridge-type surface texture with an average roughness Ra=0.02μm, which substrate is coated with cobalt/ nickel/ platinum (nickel 1.5 at %, platinum 7 at %, remainder cobalt) by direct-current sputtering in an argon atmosphere to a thickness of 800Å (0.08 μm). This resulting surface is again sputtered to apply a protective carbon coating of 200Å (0.02μm) so as to obtain the electromagnetic recording disk.

The compounds described hereinbelow are diluted in trichlorotrifluoroethane to a concentration of 0.03 wt. %, and the solution is uniformly applied by spraying to form a lubricant film by curing.

The lubricant film thickness has been measured as being approximately 30Å (0.003 μm) by using a Fourier transformation type infrared spectroscopy type FT/IR - 7000 with TR-500 (manufactured by Nihon Bunko Kogyo Co., Ltd.).

The disk resistance to contact-start-stop cycling was measured with a disk wear/friction tester PT-101 by using a thin-film head (manufactured by the U.S. company READWRITE) consisting of an alumina and titanium carbide sintered compound, with a 5¼″ (13.34 cm) diameter electromagnetic disk imparted with a lubricant film, as the slider material under cycling conditions consisting of 15 second operation/15second stop at a rotational speed of 3600 rpm and hf=0.3 μm under a load of approximately 15 gf, and the dynamic friction coefficient was measured by using a disk friction tester type PT-350 (manufactured by Patee Tech Company Ltd.), by using a Winchester type head under test conditions of 50% relative humidity, 15 gf load, and 0.86-1 rpm rotational speed for the duration of 5 minutes.

EXAMPLE 1

9.2 g (0.090 mol) of triethylamine were added, with homogenization by stirring, to a solution, obtained by dissolving 5.0 g (0.045 mol) of 2,5-diaminopyrimidine in 100 ml of dehydrated refined N,N'-dimethylformamide, in a four-neck 500 ml flask provided with a stirrer, thermometer, and reflux cooler.

While maintaining this solution at a temperature of 5° C., 200 g (0.09 mol) of perfluoroalkylpolyetherperfluoropropionyl chloride [average molecular weight 2200 (as determined by nuclear magnetic resonance spectroscopy) chemical formula:

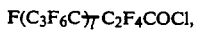

where l has a value of approximately 12, acid number 25 mgKOH/g, viscosity at 38° C.: 120 centistokes] dissolved in 200 ml of refined trichlorotrifluoroethane, were drip-fed, using a dripping funnel, for one hour, whereupon the reaction was allowed to take place by stirring the mixture on a reflux stirrer for 24 hours at a temperature of 5° C.

After the reaction had reached completion and after the trichlorotrifluoroethane had been distilled off at 60° C., addition was made of a small amount of 0.25N hydrochloric acid and 200 ml of methyl alcohol.

The resulting solution was thereupon transferred into a separating funnel to separate the supernatant. The bottom layer was again treated with 100 ml of methyl alcohol and washed for at least three times, with the solvent being removed by vacuum distillation.

The residue was washed at least two or three times with distilled water until no color change was detectable in the presence of methyl orange indicator, and 150 ml of trichlorotrifluoroethane were added to the bottom layer, the foreign particles filtered off through a 5C filter paper, the solvent removed by distillation, and the unreacted perfluoroalkylpolyetherperfluoropropionic acid was distilled under a vacuum drawn to 0.03mm Hg at a temperature of 152°-158° C. to obtain the light-brown liquid reaction product in 80% yield.

Determination of the acid number produced a value of 0.5 mg KOH/g and determination of the viscosity at 40° C. gave a value of 195 centistokes.

Infrared spectral analysis (performed with an IR spectrometer model IR810 manufactured by Nihon Bunko Kogyo Kabushiki Kaisha) showed that the 1780 cm⁻¹ absorption band characteristic of the carboxylic bond was absent, and that the the 1210-1330 cm⁻¹ band characteristics of the CF bond was present, and, furthermore, that the 1680-1700 cm⁻¹ and 3350 cm⁻¹ amide absorption bands as well as the 2850 and 2950 cm⁻¹ absorption band typical for the oscillation of the carbon - hydrogen bond were detectable.

Elemental analysis performed with a YANACO CHN coder MT3 model manufactured by Kabushiki Kaisha Yanagimoto Seisakusho revealed 22.8% C and 1.0% N as compared with theoretical values of 22.71% C and 0.95% N. In view of the virtually complete agreement between the analysis results and the theoretical values, it was concluded that the product formed by the above reaction procedure had the formula (1):

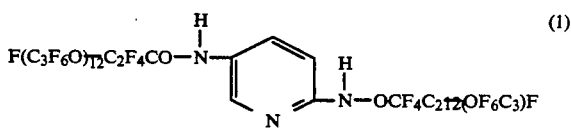

EXAMPLE 2

11 g (0.109 mol) of triethylamine were added, with homogenization by stirring, to a solution, obtained by dissolving 10.5 g (0.056 mol) of 2,4-diamino6-phenyl-1,3,5-triazine in 150 ml of dehydrated refined N,N'-dimethylformamide, in a four-neck 500 ml similar to example 1.

While stirring this solution to homogenize, 2Q0 g (0.108 mol) of perfluoroalkylpolyetherperfluoropropionyl chloride [average molecular weight 1850 (as determined by nuclear magnetic resonance spectroscopy) chemical formula:

where l has a value of approximately 10, acid number 32 mgKOH/g, viscosity at 38° C.: 90 centistokes] dissolved in 200 ml of refined trichlorotrifluoroethane, were drip-fed, using a dripping funnel, for one hour, whereupon the reaction was allowed to take place by stirring the mixture on a reflux stirrer for 24 hours at a temperature of 5° C.

After the reaction had reached completion, the trichlorotrifluoroethane was distilled off at 60° C., and addition was made of a small amount of dilute hydrochloric acid and 50 ml of methyl alcohol.

The resulting solution was thereupon transferred into a separating funnel to separate the supernatant from the bottom layer. The bottom layer was again washed with 100 ml of N,N'-dimethylformamide and washed for at least three times. After the removal of the unreacted amine, addition was made of 200 ml of methyl alcohol to separate the N,N' dimethylformamide, whereupon the solvent was removed by vacuum distillation while the residue was washed at least three times with distilled water until no color change was detectable in the presence of methyl orange indicator; whereupon 150 ml of trichlorotrifluoroethane were added and the foreign particles filtered off through a 5C filter paper and the unreacted perfluoro-alkylpolyetherperfluoropropionic acid (see FIG. 1) distilled off under a vacuum drawn to 0.03 mm Hg at a temperature of 134°-137° C. to obtain the bright-yellow liquid reaction product in 83% yield.

Determination of the acid number of this compound (see FIG. 2) produced a value of 0.3 mg KOH/g and determination of the viscosity at 40° C. gave a value of 210 centistokes.

Infrared spectral analysis performed in the same manner as described in example 1 showed that the 1780 cm$^{-1}$ absorption band characteristic of the carboxylic bond was absent, and that the 1680°–1740 cm$^{-1}$ and 3350 cm$^{-1}$ amide absorption bands as well as the 2850 and 2950 cm$^{-1}$ absorption band typical for the oscillation of the carbon-hydrogen bond were present.

Elemental analysis performed in the same manner as described in example 1 revealed 23.0% C and 1.9% N as compared with theoretical values of 23.69% C and 1.84% N. In view of the virtually complete agreement between the analysis results and the theoretical values, it was concluded that the above reaction product had the formula (2):

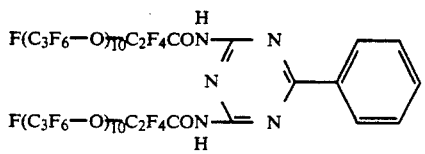

(2)

EXAMPLE 3

21 g (0.207 mol) of triethylamine were added, with homogenization by stirring, to a solution, obtained by dissolving 10 g (0.079 mol) of 2,4,6-triamino-1,3,5-triazine (specific gravity at 14° C. 1.57) in 150 ml of dehydrated refined trichlorotrifluoroethane (specific gravity at 20° C. 1.57), in a four-neck 500 ml similar to example 1.

While maintaining this solution at a temperature of 5° C., 200 g (0.2 mol) of perfluoroalkylpolyetherperfluoropropionyl chloride [average molecular weight 1000 (as determined by nuclear magnetic resonance spectroscopy) chemical formula:

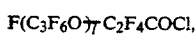

$F(C_3F_6O)_{\overline{n}}C_2F_4COCl$, where l has a value of approximately 5, acid number 65 mgKOH/g, viscosity at 38° C.: 44 centistokes] dissolved in 100 ml of refined trichlorotrifluoroethane and 100 ml of perfluorodimethylcyclohexane [boiling point 102° C., specific gravity at 25° C. 1.82, tradename FLUTEC PP3], were drip-fed, using a dripping funnel, for one hour, whereupon the reaction was allowed to take place by stirring the mixture on a reflux stirrer for 48 hours at a temperature of 5° C.

After the reaction had reached completion, the reaction mixture was transferred to a separating funnel, when addition was made of 50 ml of methyl alcohol and 50 ml of 0.25N hydrochloric acid and the mixture was allowed to stand and sediment to withdraw the bottom layer. The unreacted 2,4,6-triamino-1,3,5-triazine was then removed by filtration. The solvent was distilled off at 60° C. The residue was washed at least three or four times with distilled water until no color change was detectable in the presence of methyl orange indicator.

After washing, the perfluorodimethylcyclohexane and minor amounts of water were removed by vacuum distillation of the bottom layer and the unreacted perfluoroalkylpolyetherperfluoropropionic acid was removed by distillation at a vacuum of 0.03 mm Hg and at a temperature of 85°–100° C. to obtain the light-brown liquid reaction product in 75% yield.

Determination of the acid number of this reaction product performed in the same manner as stated in example 1 produced a value of 0.2 mg KOH/g and determination of the viscosity at 40° C. gave a value of 135 centistokes.

Infrared spectral analysis showed that the 1780 cm$^{-1}$ absorption band characteristic of the carboxylic bond was absent, and that the 1680–1700 cm$^{-1}$ and 3350 cm$^{-1}$ amide absorption bands were present.

Elemental analysis revealed 22.0% C and 2.7% N as compared with theoretical values of 22.39% C and 2.75% N. In view of the virtually complete agreement between the analysis results and the theoretical values, it was concluded that the above reaction product had the formula (3):

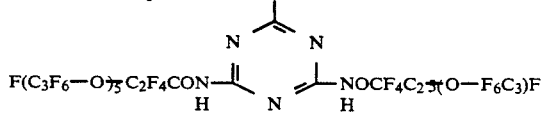

(3)

EXAMPLE 4

11 g (0.108 mol) of triethylamine were added, with homogenization by stirring, to a solution, obtained by dissolving 4.6 g (0.054 mol) of 3-amino-1H-1,2,3,4-tetrazol in 100 ml of dehydrated refined N,N'-dimethylformamide, in a four-neck 500 ml equipped with a reflux cooler and thermometer.

While maintaining this solution at a temperature of 5° C., 200 g (0.108 mol) of perfluoroalkylpolyetherperfluoropropionylchloride [average molecular weight 1850 (as determined by nuclear magnetic resonance spectroscopy) chemical formula:

$F(C_3F_6O)_{\overline{n}}C_2F_4COCl$, where l has a value of approximately 10, acid number 32 mgKOH/g, viscosity at 38° C.: 90 centistokes] dissolved in 200 ml of refined trichlorotrifluoroethane, were drip-fed, using a dripping funnel, for one hour, whereupon the reaction was allowed to take place by stirring the mixture on a reflux stirrer for 24 hours at a temperature of 5° C.

After the reaction had reached completion, the trichlorotrifluoroethane was distilled off at 60° C., and addition was made of a small amount of dilute 0.25N hydrochloric acid and 50 ml of methyl alcohol.

The resulting solution was thereupon transferred into a separating funnel to separate the supernatant from the bottom layer. The bottom layer was again washed with 100 ml of N,N'-dimethylformamide and washed for at least three times. After the removal of the unreacted amine, the solvent was distilled off under a vacuum while the residue was washed with distilled water until no color change was detectable in the presence of methyl orange indicator; whereupon 200 ml of trichlorotrifluoroethane were added and the solution dried on anhydrous magnesium sulfate; after filtration, the solvent was distilled off and the residue distilled off under a vacuum drawn to 0.03 mm Hg at a temperature of 134°–137° C. to remove the unreacted perfluoroalkylpolyetherperfluoropropionic acid so as to obtain the light-brown liquid reaction product in 85% yield.

Determination of the acid number of this reaction product was performed by potentiometric titration (with a potentiometer model AT-200 manufactured by Kyoto Denshi Kogyo Seisakusho) and produced a value of 0.3 mg KOH/g. Determination of the viscosity at 40° C. gave a value of 140 centistokes.

Infrared spectral analysis (performed with an IR spectrometer model IR810 manufactured by Nihon Bunko Kogyo Kabushiki Kaisha) showed that the 1780 cm$^{-1}$ absorption band characteristic of the carboxylic bond was absent, and that the 1690–1710 cm$^{-1}$ and 3350 cm$^{-1}$ amide absorption bands were present.

Elemental analysis (performed with a YANACO CHN coder MT3 model manufactured by Kabushiki Kaisha Yanagimoto Seisakusho) revealed 22.0% C and 2.0% N as compared with theoretical values of 21.74% C and 1.89% N. In view of the virtually complete agreement between the analysis results and the theoretical values, it was concluded that the above reaction product had the formula (4):

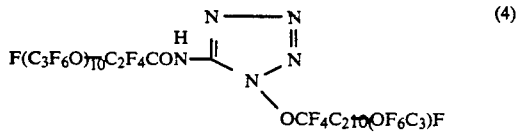

(4)

EXAMPLE 5

11 g (0.108 mol) of triethylamine were added, with homogenization by stirring, to a dispersant obtained by addition of 4.2 g (0.018 mol) of hexaaminocyclotriphosphonitrile (chemical formula: [N=P (NH$_2$)$_2$]$_3$) to a mixture consisting of 100 ml of dehydrated refined trichlorotrifluoroethane and 50 ml of N,N′-dimethylformamide, in a four-neck 500 ml equipped with a stirrer, reflux cooler and thermometer, while maintaining the this solution at a temperature of 5° C.

While homogenizing this reaction mixture by stirring, 200 g (0.108 mol) of perfluoroalkylpolyetherperfluoropropionylchloride [average molecular weight 1850 (as determined by nuclear magnetic resonance spectroscopy) chemical formula:

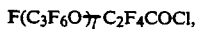

where l has a value of approximately 10, acid number 32 mgKOH/g, viscosity at 38° C.: 90 centistokes] dissolved in 200 ml of refined trichlorotrifluoroethane, were drip-fed, using a dripping funnel, for one hour, whereupon the reaction was allowed to take place by stirring the mixture on a reflux stirrer for 24 hours at a temperature of 5°–10° C.

After the reaction had reached completion, the unreacted solids were separated by filtration and the excess trichlorotrifluoroethane was distilled off at 50° C., whereupon addition was made of a small amount of 0.25N hydrochloric acid and 100 ml of methyl alcohol.

The bottom layer was drawn off and washed, at least three or four times, with distilled water until no color change was detectable in the presence of methyl orange indicator or until no finely dispersed white clouding was observable upon testing with a silver nitrate solution. After washing, the solvent was distilled off under a vacuum and the unreacted perfluoroalkylpolyetherperfluoropropionic acid distilled off under a vacuum drawn to 0.03 mm Hg at a temperature of 134°–137° C. so as to obtain the light-brown liquid reaction product in 85% yield.

Determination of the viscosity at 40° C. gave a value of 105 centistokes and determination of the acid number of this reaction product produced a value of 0.3 mg KOH/g.

Infrared spectral analysis (performed with an IR spectrometer model IR810 manufactured by Nihon Bunko Kogyo Kabushiki Kaisha) showed that the 1680–1740 cm$^{-1}$ and 3350 cm$^{-1}$ amide absorption bands were present and that bands resembling the 1262 cm$^{-1}$ absorption band for the elongation/contraction of the P=N bond and the 1286 cm$^{-1}$ absorption band characteristic of the C-F bond were vaguely present and that a 540 cm$^{-1}$ absorption band attributable to the P-N bond was in evidence.

Elemental analysis (performed with a YANACO CHN coder MT3 model manufactured by Kabushiki Kaisha Yanagimoto Seisakusho) revealed 21.0% C and 1.0% N as compared with theoretical values of 21.4% C and 1.1% N. In view of the virtually complete agreement between the analysis results and the theoretical values, it was concluded that the above reaction product had the formula (5):

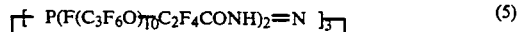

(5)

EXAMPLE 6

11 g (0.108 mol) of triethylamine were added, with homogenization by stirring, to a solution, obtained by dissolving 23.5 g (0.054 mol) of (3,3′-(meta-amino phenoxy)-diphenyl sulfone in 100 ml of dehydrated refined N,N′-dimethylformamide, in a four-neck 500 ml flask provided with a thermometer, and reflux cooler.

While maintaining this solution at a temperature of 5° C., 200 g (0.108 mol) of perfluoroalkylpolyetherperfluoropropionylchloride [average molecular weight 1850 (as determined by nuclear magnetic resonance spectroscopy) chemical formula:

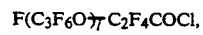

where l has a value of approximately 10, acid number 32 mgKOH/g, viscosity at 38° C.: 90 centistokes] dissolved in 200 ml of refined trichlorotrifluoroethane, were drip-fed, using a dripping funnel, for one hour, whereupon the reaction was allowed to take place by stirring the mixture on a reflux stirrer for 24 hours at a temperature of 5° C.

After the reaction had reached completion and after the trichlorotrifluoroethane had been distilled off at 60° C., addition was made of a small amount of 0.25N hydrochloric acid and 50 ml of methyl alcohol.

The resulting solution was thereupon transferred into a separating funnel to separate the supernatant and bottom layer. The bottom layer was treated with 100 ml of N,N′-dimethylformamide and washed for at least three times. After removal of the unreacted amine, 200 ml of methyl alcohol were added, the N,N′-dimethylformamide separate and the solvent removed by vacuum distillation. The residue was washed, at least three times, with distilled water until no color change was detectable in the presence of methyl orange indicator, whereupon 200 ml of trichlorotrifluoroethane were added and the foreign particles filtered off through 5C filter paper. The unreacted perfluoroalkylpolyetherperfluoropropionic acid was distilled under a vacuum drawn to 0.03 mm Hg at a temperature of 134°-137° C. to obtain the light-brown liquid reaction product in 85% yield.

Determination of the acid number produced a value of 0.2 mg KOH/g and determination of the viscosity at 40° C. gave a value of 250 centistokes.

Infrared spectral analysis performed in the same manner as described in example 1 showed that the 1780 cm$^{-1}$ was absent, and that the 1680-1720 cm$^{-1}$ and 3350 cm$^{-1}$ amide absorption bands were present, and also that the 2850 and 2950 cm$^{-1}$ absorption band typical for the oscillation of the carbon-hydrogen bond were detectable.

Elemental analysis revealed 26.9% C and 0.7% N as compared with theoretical values of 26.70% C and 0.69% N. In view of the virtually complete agreement between, the analysis results and the theoretical values, it was concluded that the reaction product had the formula (6):

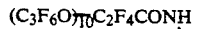
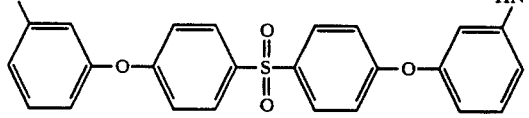
(6)

Table 1 hereinbelow gives the characteristics of the lubricant compounds for electromagnetic recording media obtained in the above examples.

TABLE 1

| | Lubricant film thickness (μm) | No. of C.S.S. cycles | Test humidity % | Head contact time 48 hours | |
|---|---|---|---|---|---|
| | | | | μD | μS |
| Example 1 | 0.003 | 50000 | 50 | 0.24 | 0.33 |
| Example 2 | 0.003 | 60000 | 50 | 0.27 | 0.35 |
| Example 3 | 0.003 | 60000 | 50 | 0.23 | 0.30 |
| Example 4 | 0.003 | 50000 | 50 | 0.27 | 0.36 |
| Example 5 | 0.003 | 70000 | 50 | 0.22 | 0.31 |
| Example 6 | 0.003 | 45000 | 50 | 0.27 | 0.39 |
| Example 7*1 | 0.003 | 13000 | 50 | 0.55 | 1.15 |
| Example 8*2 | 0.003 | 15000 | 50 | 0.50 | 1.10 |

Note 1:
Krytox 143AC manufactured by Dupont, U.S.A. (average molecular weight: 6,500) Structural formula:

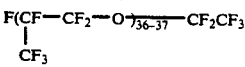

Note 2:
Krytox 157FS-M manufactured by Dupont, U.S.A. (average molecular weight: 4,500) Structural formula:

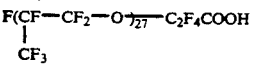

The present invention thus provides novel substances whose effectiveness as lubricants for electromagnetic recording media has become clear from the description hereinabove.

The lubricants for electromagnetic media in accordance with the present invention are perfluoroalkylpolyether derivatives represented by the general formula (1) given hereinabove and are distinguished by a superior lubricating effect and outstanding endurance.

For this reason, lubricants for electromagnetic media in accordance with the present invention are extremely effective as thin-film lubricants applied onto the surface of electromagnetic recording media with a high recording density, and electromagnetic recording media with a high recording density whose protective film surface has been treated with the lubricants according to the present invention exhibit a very outstanding CSS (contact-start-stop) cycling resistance.

While there has been a description of what are at present considered to be preferred embodiments of the invention, it will be understood that various modifications may be made thereto, and it is intended that the appended claims cover all such modifications as fall within the true spirit and scope of the invention.

What is claimed is:

1. A lubricant for electromagnetic recording media, said lubricant having the formula (1):

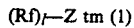

wherein Rf is a flourine-containing polyoxyalkylene group having a molecular weight between 400 and 10,000 selected from the group consisting of X(C$_3$F$_6$O)$_m$—CFYCO—, X(C$_3$F$_6$O)$_m$—(CF$_2$O)$_n$—CFYCO— and X(C$_2$F$_4$O)$_m$—(CF$_2$O)$_n$—CFYCO—;

wherein m is an integer between 3 and 85; n is an integer between 1 and 100; X is a member selected from the group consisting of H—, F—, CF$_3$—, C$_2$F$_5$—, C$_3$F$_7$—, CF$_3$O—, C$_2$F$_5$O —and C$_3$F$_7$O—; and Y is a member selected from the group consisting of F—, CF$_3$—and C$_2$F$_5$—;

wherein l is an integer from 1 to 8; and wherein Z is a radical of a triazine compound containing at least one amino or imino group;

wherein when l is greater than 1, the Rf groups are the same or different; and wherein each Rf—Z bond is a C—N bond.

2. A lubricant according to claim 2, wherein Z is a radical of a triazine compound having at least one amino group on a ring carbon or ring nitrogen thereof.

3. A lubricant according to claim 2, wherein Z is a radical of a compound selected from the group consisting of 2,4,6-triamino-1,3,5-triazine and 2,4-diamino-6-phenyl-1,3,5-triazine.

4. A lubricant according to claim 1, wherein Z is a radical of a triazine compound having at least one amino group on a ring carbon thereof.

* * * * *